US012482441B2

(12) United States Patent
Swope

(10) Patent No.: US 12,482,441 B2
(45) Date of Patent: Nov. 25, 2025

(54) ADJUSTABLE BRIDGE FOR STRINGED INSTRUMENT DEVICE AND METHOD

(71) Applicant: Christopher Clay Swope, Overland Park, KS (US)

(72) Inventor: Christopher Clay Swope, Overland Park, KS (US)

( * ) Notice: Subject to any disclaimer, the term of this patent is extended or adjusted under 35 U.S.C. 154(b) by 642 days.

(21) Appl. No.: 17/849,073

(22) Filed: Jun. 24, 2022

(65) Prior Publication Data

US 2022/0328022 A1 Oct. 13, 2022

Related U.S. Application Data

(63) Continuation-in-part of application No. 17/488,970, filed on Sep. 29, 2021, now Pat. No. 11,837,201.

(60) Provisional application No. 63/085,245, filed on Sep. 30, 2020.

(51) Int. Cl.

*G10D 3/04* (2020.01)
*G10D 1/08* (2006.01)
*G10D 3/12* (2020.01)

(52) U.S. Cl.

CPC ............... *G10D 3/04* (2013.01); *G10D 1/085* (2013.01); *G10D 3/12* (2013.01)

(58) Field of Classification Search

CPC ............ G10D 3/04; G10D 1/085; G10D 3/12; G10D 3/00

See application file for complete search history.

(56) References Cited

U.S. PATENT DOCUMENTS

| | | | |
|---|---|---|---|
| 2,972,923 A | 2/1961 | Fender | |
| 3,241,418 A | 3/1966 | Fender | |
| 8,283,542 B2 | 10/2012 | Woodland et al. | |
| 10,395,627 B2 | 8/2019 | Colas et al. | |
| 2005/0045018 A1 | 3/2005 | Turner | |
| 2018/0012576 A1* | 1/2018 | Colas ..................... | G10D 1/085 |

OTHER PUBLICATIONS

Office Action in co-pending U.S. Appl. No. 17/488,970, dated Mar. 31, 2023.

* cited by examiner

*Primary Examiner* — Kimberly R Lockett

(74) *Attorney, Agent, or Firm* — Hovey Williams LLP; Crissa A. Cook

(57) ABSTRACT

An adjustable bridge unit for use with a stringed instrument, such as an electric guitar. The construction of the unit allows for an unimpeded string path from the rear of an adjustable height bridge in a downward trajectory toward a tailpiece. Moreover, the bridge unit may be used to perform a variety of corrective measures, such as saddle height, intonation, and string alignment.

20 Claims, 10 Drawing Sheets

ADJUSTABLE BRIDGE FOR STRINGED INSTRUMENT DEVICE AND METHOD

CROSS-REFERENCE TO RELATED APPLICATIONS

The present application is a continuation-in-part of U.S. patent application Ser. No. 17/488,970, filed Sep. 29, 2021, entitled ADJUSTABLE BRIDGE FOR STRINGED INSTRUMENT DEVICE AND METHOD, which claims the priority benefit of U.S. Provisional Patent Application Ser. No. 63/085,245, filed Sep. 30, 2020, entitled ADJUSTABLE BRIDGE FOR STRINGED INSTRUMENT DEVICE AND METHOD, each of which are incorporated by reference in their entireties herein.

BACKGROUND OF THE INVENTION

Field of the Invention

The present invention is directed to an adjustable bridge for a stringed instrument. More particularly, embodiments of the invention relate to an adjustable bridge construction that allows for an unimpeded string path from the bridge to tailpiece, while allowing the ability and ease of intonation for individual strings. This construction addresses historic stability, intonation, and alignment issues with the traditional bridge designs.

Description of Related Art

The electric guitar has been a popular instrument for the last seven decades. Many of the most popular designs today are those that were created in the 1950s. As styles of music, gauges of strings, and manufacturing technologies have changed, many of the components of these original designs no longer yield optimal performance. An entire industry of aftermarket, direct fit replacement components has developed that address age old inadequacies of the original designs.

One such original design is a "floating" bridge, as described in U.S. Pat. No. 2,972,923, that is used in tandem with a separate vibrato/tailpiece. A similar bridge is described in U.S. Pat. No. 3,241,418. The lighter gauge strings used by players today results in minimized downward pressure exerted on the individual string saddles. Additionally, modern playing styles are more aggressive and exert more unwanted side to side tension on the string/saddle contact point. These two realties combine and exacerbate the historic flaws of this particular design, namely the outside saddles moving out of alignment and strings releasing from their saddle slots, thus throwing the instrument out of tune.

Guitarists have used a variety of remedies to increase the downward tension of the strings on the saddles. These include raising the adjustable bridge to a height that renders the guitar difficult to play, which is followed by shimming the neck angle to bring the instrument back into playability. There are also aftermarket tailpieces that create a steeper angle behind the bridge providing more downward tension at the strings contact point on the saddle. However, this creates an additional problem, as the strings then often make contact with the back of the bridge base creating an added friction point that inhibits the effective use of the vibrato by disrupting the smooth pivoting motion required for tuning stability. It also further inhibits access to the individual intonation adjustment screws of the individual string saddles. Also, this contact of the string against the back of the bridge base creates an unwanted audible vibratory point.

More recently, U.S. Pat. No. 8,283,542 addresses some of these concerns with a bridge that has two compensated saddles that are adjusted by means of four "intonation" screws. However, this method is unable to truly adjust the intonation requirements of each individual string. A multi string saddle design such as this, with each saddle housing slots for three strings, can only accurately intonate two of the strings given its design. The third string will just be an approximation, a compensated tuning. In some instances, the third string will be so noticeably out of tune to the average ear that it needs to be brought close to pitch by adjustments that render one of the other formerly intonated strings slightly out of intonation as well. The multitude of string gauges, wound and unwound string options, and alternate tunings that guitarist employ demand different intonation points for each string and will not lend themselves to a compensated saddles system.

Another historic issue with the original designs is that for many users the pivoting action of the bridge is undesirable. Often users with certain set up requirements for given styles of playing look for a means of stabilizing the pivoting action, in effect converting the pivoting or "rocking" bridge into a fixed unit.

Further, when applying a stabilization correction with, for instance, a nylon sleeve that makes for a tight fit, the exact location of the bridge thimbles that the post rest in is imperative. A 0.020" displacement of either thimble one direction or another is enough to set the placement out of the bounds of possibility for these makeshift solutions. As this is within the margin of error of many manufacturers, a better solution is required.

Another historic problem, which to date remains unaddressed, is that over the many years of guitar production, bridge locations have changed. While these changes are subtle, when combined with modern light gauge strings, which require a different intonation point as intonation is dictated by the core diameter of the string, they nonetheless create a reality that certain instruments are not able to be correctly intonated given the narrow field of travel that is allowed for the intonation saddles by the tight geometry of the original designs.

SUMMARY OF THE INVENTION

In one embodiment of the present invention, there is provided a bridge for a stringed instrument comprising an elongated base piece comprising a front plate and a rear plate defining a channel therebetween, a plurality of string saddles residing within the channel and comprising a centrally positioned string seat and a pair of side segments, and at least two intonation screws. At least one of the side segments on at least two string saddles comprises a screw hole formed therethrough that is positioned laterally offset from the string seat. Each of the at least two intonation screws pass through a corresponding opening in the front plate and/or rear plate and are threadedly coupled with the offset screw hole of one of the at least two string saddles. In one embodiment, there is provided a stringed instrument comprising the bridge installed thereon.

In one embodiment of the present invention, there is provided a bridge for a stringed instrument comprising an elongated base piece comprising a front plate and a rear plate defining a channel therebetween, and a plurality of string saddles residing within the channel and comprising one or more interior string saddles and a pair of outermost string saddles positioned at opposite distal ends of the elongated base piece. Each of the plurality of string saddles comprises a centrally positioned string seat, a pair of side segments, and an intonation screw hole formed in a lower portion of the string saddle. The intonation screw hole formed in each of the two outermost string saddles is positioned laterally offset from the string seat. The intonation screw hole formed in each of the innermost string saddles is positioned in line with the string seat. The bridge further comprises a plurality of intonation screws passing through a corresponding opening in the front plate and/or rear plate and threadedly coupled with one of the intonation screw holes. In one embodiment, there is provided a stringed instrument comprising the bridge installed thereon.

In one embodiment of the present invention, there is provided a bridge for a stringed instrument comprising an elongated base piece comprising a base plate, a front plate, and a rear plate defining a channel, and a plurality of string saddles residing within the channel comprising one or more interior string saddles and a pair of outermost string saddles positioned at opposite distal ends of the elongated base piece. Each of the interior string saddles comprises a centrally positioned string seat, a pair of side segments, an intonation screw hole formed therethrough, and one or more height adjustment screw holes formed therethrough. The bridge further comprises a plurality of intonation screws threadedly coupled with a corresponding intonation screw hole and passes through a corresponding opening in the front plate and/or rear plate, and a plurality of height adjustment screws threadedly coupled with a corresponding height adjustment screw hole and contacting the base. In one embodiment, there is provided a stringed instrument comprising the bridge installed thereon.

In one embodiment of the present invention, there is provided a bridge for a stringed instrument with six barrel saddles, wherein each saddle comprises an adjustment screw to set the intonation for its specific string.

In one embodiment of the present invention, there is provided a bridge for a stringed instrument, wherein each intonation screw is offset to the side from the barrel saddle center so as to provide access for an adjustment tool and to allow clearance for the strings to pass at a steeper angle behind the bridge.

In one embodiment of the present invention, there is provided a bridge for a stringed instrument, wherein the intonation screw in the two outermost string saddles is offset to the side from the respective barrel saddle center so as to provide access for an adjustment tool and to allow clearance for the strings to pass at a steeper angle behind the bridge.

In one embodiment of the present invention, there is provided a bridge for a stringed instrument, wherein each intonation adjustment screw hole is drilled in the lower quadrant of the saddle barrel such that the screw hole is closer to the bottom of the bridge base, thereby providing greater clearance for the strings.

In one embodiment of the present invention, there is provided a bridge for a stringed instrument with the two outermost saddles having additional material on the side distal from the saddle center, thereby providing the structural integrity required to drill the intonation screw hole completely out of the path of the string line, as these outside strings have a path alignment that follows the edges of the fingerboard radius which are the lowest points, thus requiring greater clearance.

In one embodiment of the present invention, there is provided a bridge for a stringed instrument, wherein the added material/saddle extensions on the outside of the two saddles furthest from center feature a smaller diameter than the rest of the saddle in order to allow clearance for the two button head screw or slagged/flange press-fit post attachments that are located slightly above the surface of the bridge plate in the very tight geometry that is common in the original designs.

In one embodiment of the present invention, there is provided a bridge for a stringed instrument, wherein a plurality of holes/openings on both sides of the bridge plate allow for both insertion of the intonation screws from the rear and a through hole in the front of the plate, which allows the screw to anchor itself, thus preventing side to side movement.

In one embodiment of the present invention, there is provided a bridge for a stringed instrument, wherein the bridge plate comprises a plurality of slots machined into the rear of the plate along each string line providing additional clearance to accommodate the steepest of angles required for the strings to pass unimpeded on their path to the instrument tailpiece.

In one embodiment of the present invention, there is provided a bridge for a stringed instrument, wherein the bridge base can be supported in the traditional manner by two posts which allow for raising and lowering the entire system by use of a pair of internal access height adjustment screws. The bridge may further include an external threaded post that accepts a larger diameter collar.

In one embodiment of the present invention, there is provided a bridge for a stringed instrument comprising a collar, which is rotatably coupled with each post, enlarging the diameter of the post and converting from a pivot style to a fixed bridge system.

In one embodiment of the present invention, there is provided a bridge for a stringed instrument, wherein the inner diameter of the collar can be tapped from a centrally located hole through the collar or through a hole that is offset from the center of the collar, depending on application needs.

In one embodiment of the present invention, there is provided a bridge for a stringed instrument comprising one or more centrally located (interior) string saddles with individual saddle height adjustment screws.

In one embodiment of the present invention, there is provided a bridge for a stringed instrument comprising a pair of outermost string saddles positioned at opposite distal ends and corresponding deep slots (notches) formed in a rear plate.

DETAILED DESCRIPTION

The present invention is concerned with an adjustable bridge for a stringed instrument. The adjustable bridge may advantageously be retrofit into an instrument having an existing standard bridge design, or the adjustable bridge may be installed during construction of the stringed instrument.

Figure 6:
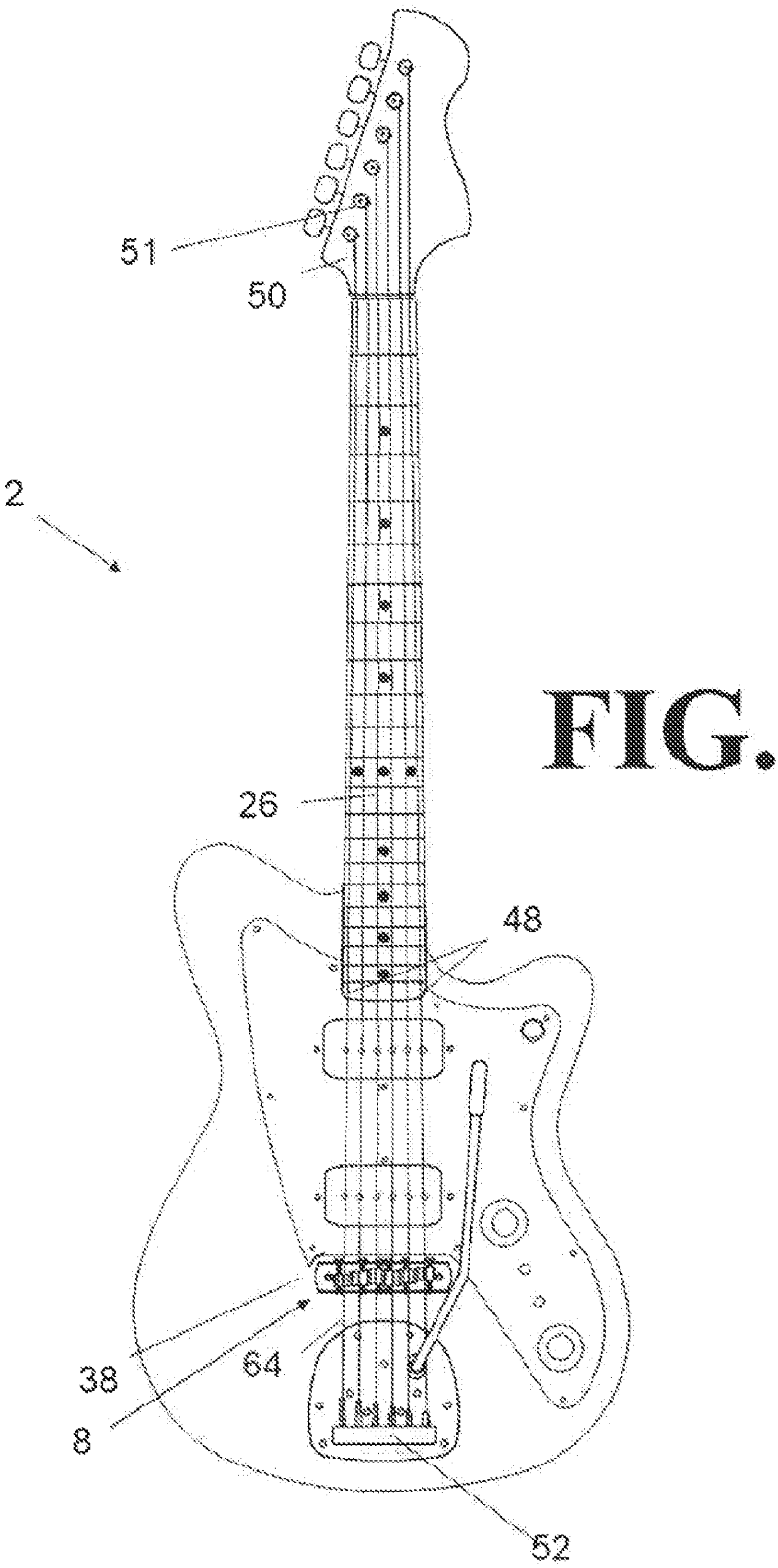
FIG. 6 is a top view of an electric guitar comprising a bridge unit installed thereon, according to one embodiment of the present invention.

As shown in FIG. 6, the stringed instrument 2 may be a six-string electric guitar. However, it will be understood that the adjustable bridge described herein may also be used in conjunction with other stringed instruments, both electric and acoustic, and with any number of strings. Stringed instrument 2 generally comprises a body 38, a fingerboard (or neck) 26, a headstock 50, and a plurality of strings 64 each defining a string path between the body 38 and headstock 50. In particular, each of the plurality of strings 64 is attached at one end to a tailpiece 52 within the body 38 and at the other end to a tuning peg 51 within the headstock 50. The strings 64 are lifted and supported off of the body 38 and fingerboard 26 by a bridge 8, thereby allowing the strings 64 to be tuned and played as desired by a user.

Referring now to FIGS. 1-5, a bridge 8 is shown and described below. The bridge 8 generally comprises an elongated base piece 10 housing a plurality of individual string saddles 12 configured to support individual strings 64. The base piece 10 comprises a front plate 65 and rear plate 66 defining a generally U-shaped channel therebetween, in which the string saddles 12 at least partially reside. Each of the string saddles 12 has a corresponding dedicated intonation screw 14, which is used for adjusting the position of the string saddle within the channel.

Figure 1:
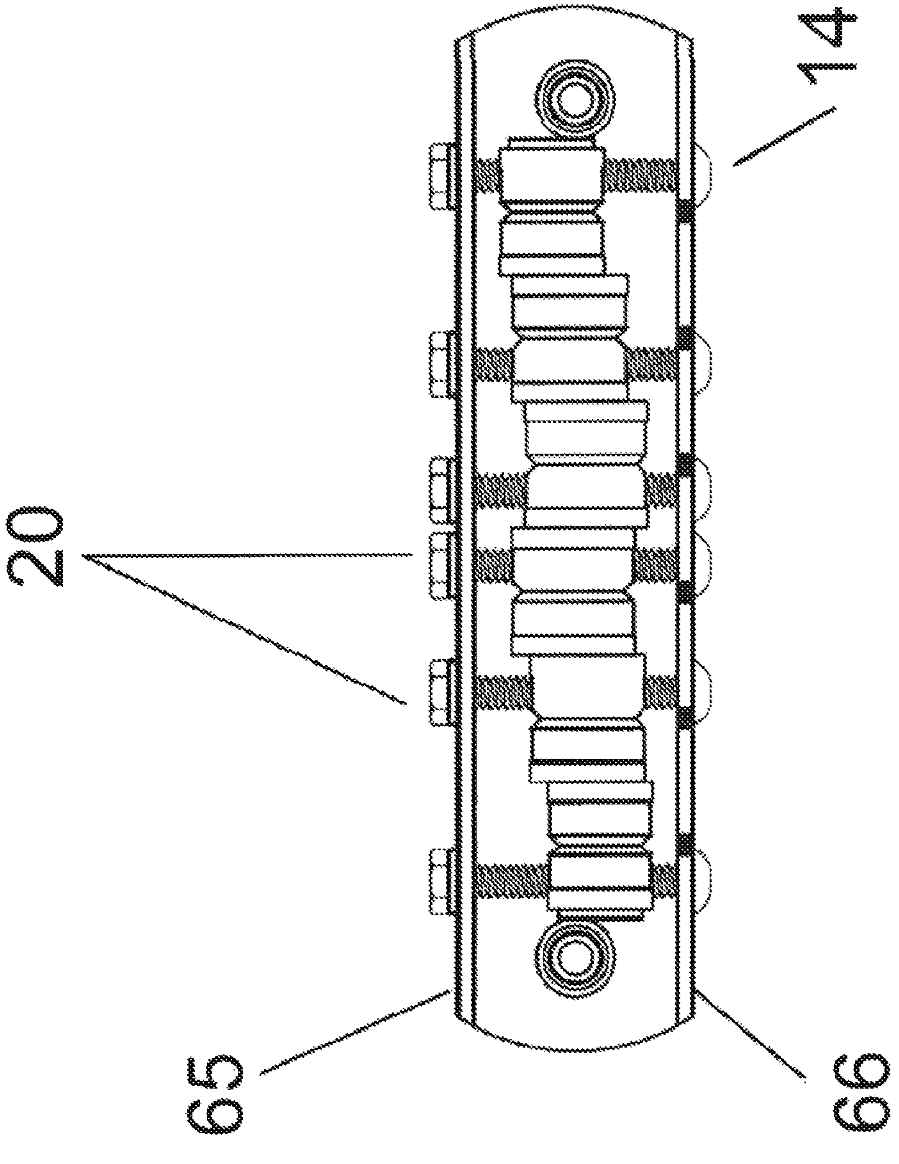
FIG. 1 is a top view of a bridge unit according to one embodiment of the present invention.
Figure 2:
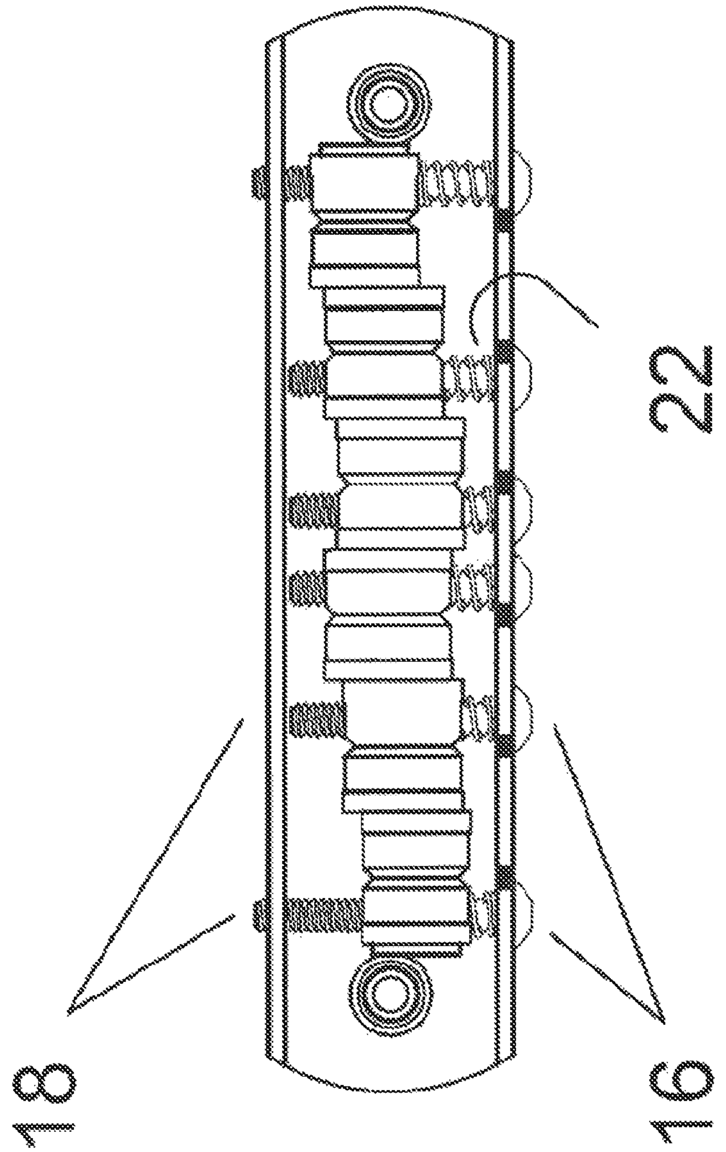
FIG. 2 is a top view of a bridge unit according to another embodiment of the present invention.

As shown in FIG. 1, in certain embodiments, intonation screws 14 pass through the rear openings 16 formed in rear plate 66, thread through the individual saddles 12, and continue through the front openings 18 formed in front plate 65. In certain embodiments, the openings 16, 18 are spaced apart in irregular intervals across the front plate 65 and/or rear plate 66, which accommodates offset positioning of the intonation screws 14 relative to the saddles 12, as described in greater detail below. In certain embodiments, the intonation screws 14 may be anchored to the front plate 65 with locking nuts 20, and each barrel saddle 12 may be individually adjusted with twisting of the dedicated screw 14. As shown in FIG. 2, in alternative embodiments, each saddle 12 may be held firmly in place by a compression spring 22 positioned around the dedicated intonation screw 14 between the rear of the saddle 12 and the interior surface of rear plate 66. Alternatively, the intonation screws 14 may be held in place with C-rings. Regardless, in certain embodiments, each intonation screw 14 may be threadedly coupled with a screw hole in a corresponding string saddle 12, such that adjustment of the saddles 12 generally occurs by twisting of the intonation screw 14.

Figure 3:
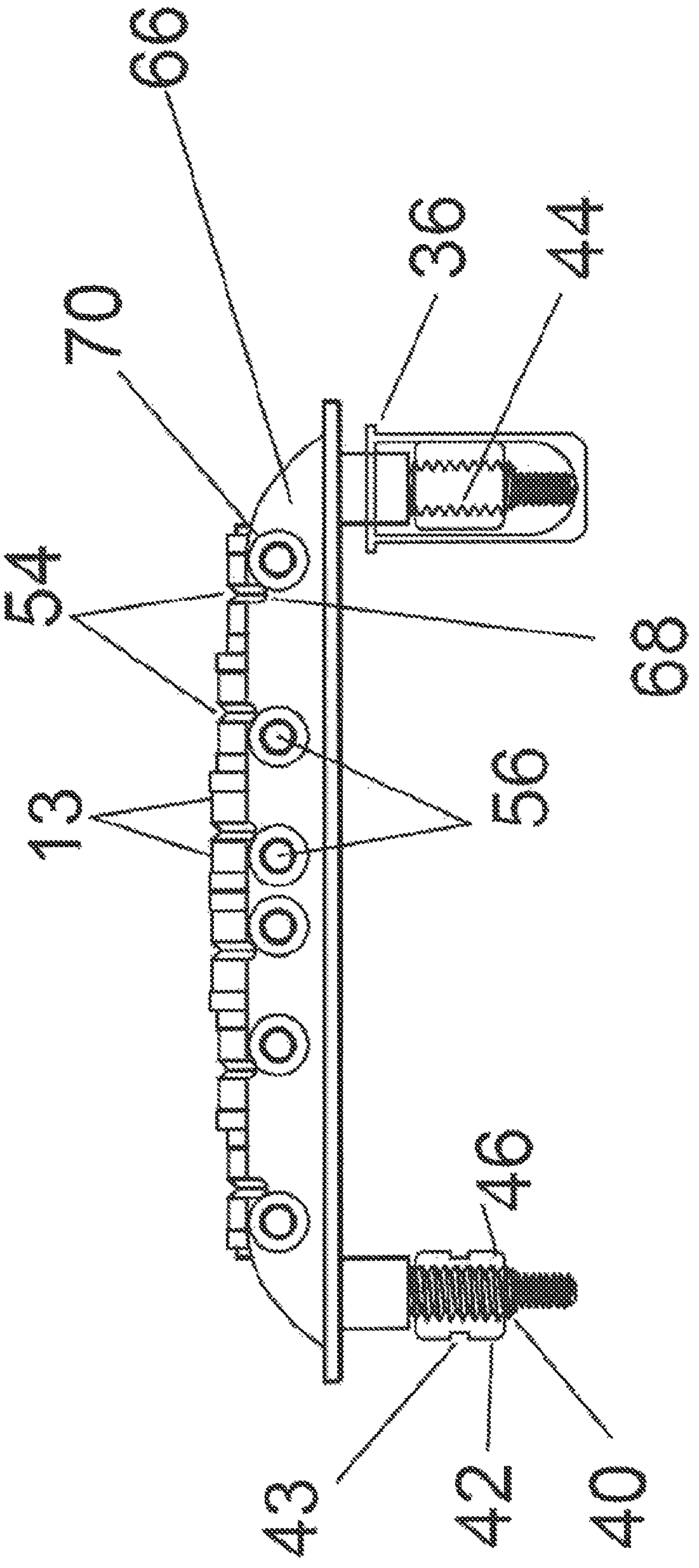
FIG. 3 is a rear view of a bridge unit according to one embodiment of the present invention, wherein certain portions of the bridge unit are cut away to illustrate internal details of the unit.
Figure 4:
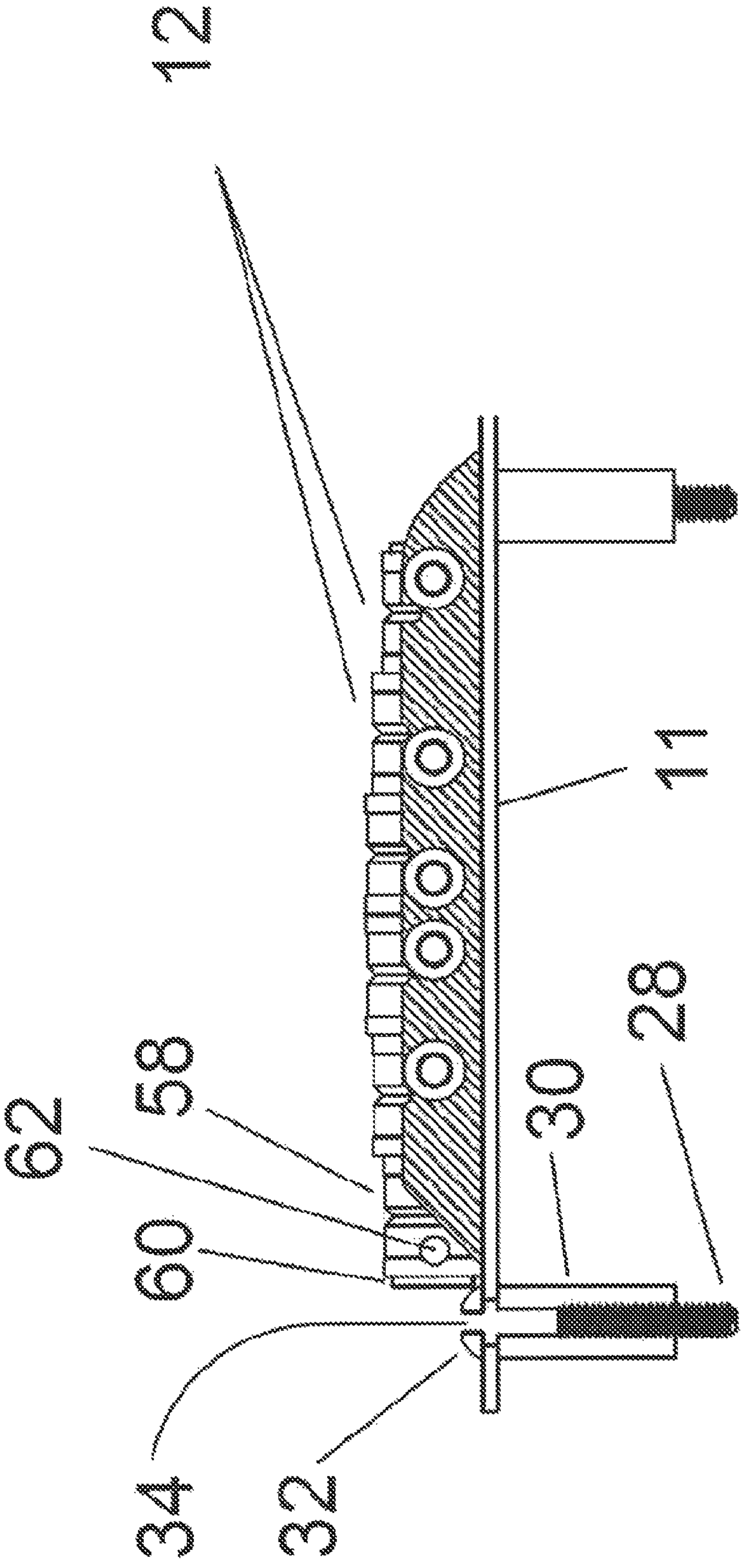
FIG. 4 is a rear view of a bridge unit according to one embodiment of the present invention, wherein certain portions of the bridge unit are cut away to illustrate internal details of the unit.
Figure 5:
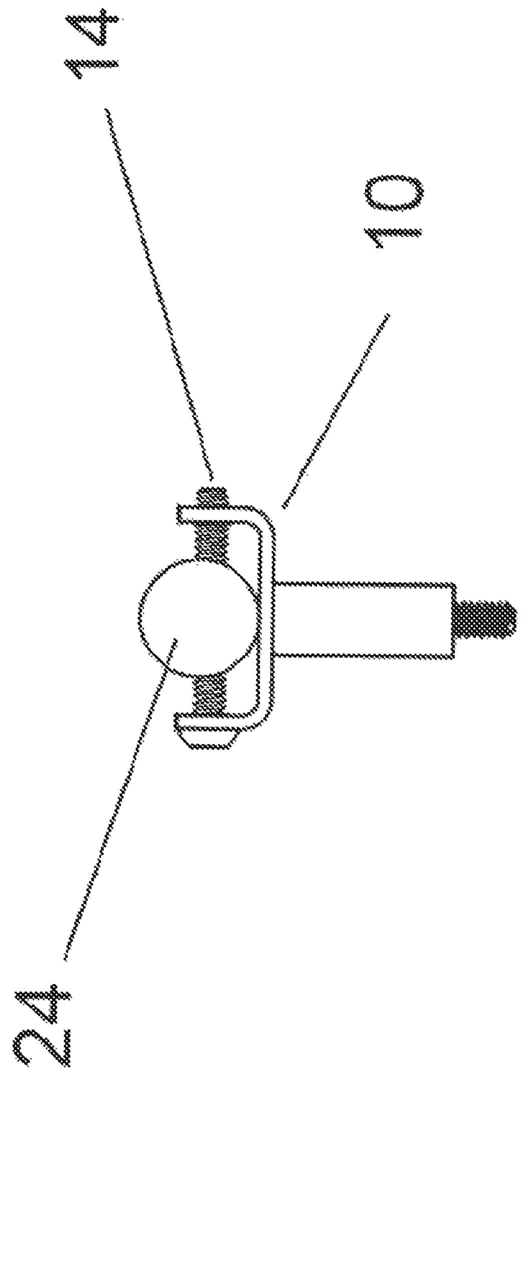
FIG. 5 is a side view of a bridge unit according to one embodiment of the present invention.

String saddles 12 may be any of a variety of designs, having a variety of geometries and sizes. However, as shown in FIGS. 1-5, in certain embodiments the string saddles 12 may be barrel style saddles, which have a generally cylindrical shape. A seat 54 may be formed in a center plane of the saddle 12, dividing the saddle into two side segments 13, and upon which an instrument string 64 may be supported and/or held in place. For example, seat 54 may comprise a radii milled into the saddle 12 to facilitate seating of the string. As best shown in FIGS. 3 and 4, the barrel saddle diameters may have differing sizes to match the placement of each string to the overall radius of the fingerboard 26.

In certain embodiments, each intonation screw 14 may be offset from the center plane (or seat 54) to either side segment 13 of the respective barrel saddle 12. Thus, at least one of the side segments 13 on each of the string saddles 12 comprises a screw hole 62 formed therethrough that is positioned laterally offset from the string seat 54. The offset configuration positions the intonation screws 14 such that they are not directly underneath the instrument strings, thereby providing easier access to use an adjustment tool to twist the intonation screws 14. This configuration also allows clearance for the strings 64 to pass at a steeper angle behind the bridge 8 toward the tailpiece 52. Thus, in certain embodiments, the intonation screws 14 are offset as far outside of the string paths as mechanically possible. In certain embodiments, the laterally offset screw holes 62 extend predominantly through a lower portion (i.e., closer to the base piece 10) of a side segment 13 (which may be considered a lower quadrant of the barrel saddle 12), which further reduces interference of the string 64 path to the tailpiece 52.

In certain embodiments, the plurality of string saddles 12 comprises one or more interior string saddles 12 and a pair of outermost string saddles 58 positioned at opposite distal ends of the elongated base piece 10. The two outermost string saddles 58 may each comprise an extended segment 60 on the outermost side segment 13 (i.e., the side furthest from the centerline of the instrument). In such embodiments, the offset screw holes 62 of the outermost string saddles 58 are offset from the string path and string seat 54 by a greater distance than the offset screw holes 62 formed in the one or more interior string saddles 12. As shown, in certain embodiments, the diameter of extended segment 60 may be smaller than the diameter of the side segments of the barrel style saddle 12. The smaller diameter allows for the necessary clearance of the post mechanism (described below) that resides above the plane of the base piece 10 but also maintains the structural integrity required for the intonation screw 14 to extend through the hole 62.

Bridge 8 may comprise one or more additional features that allow for improved string clearance. In certain embodiments, the rear plate 66 is milled as low as possible (i.e., just to the tops of the intonation screwhead line 70. Thus, the openings 16 in rear plate 66 may be formed predominantly in an upper portion of rear plate 66 (i.e., farther from base piece 10). In certain embodiments, rear plate 66 may comprise a plurality of notches or channels 68 formed therein. The notches 68 may be formed in regularly spaced intervals across rear plate 66, and can be aligned with string seats 54 and/or offset from the intonation screws 14. Such features can advantageously allow the strings to pass unimpeded and at steeper angles toward the tail piece 52.

Reference is made below to FIGS. 3 and 4, which show different cut away views of an exemplary bridge 8 so as to better illustrate certain features described herein. It should be understood, however, that features illustrated in FIG. 3 can be used in combination with features illustrated in FIG. 4 (and vice versa) within embodiments of the present invention.

In certain same or other embodiments, bridge 8 comprises a pair of posts 30 extending from a bottom side 11 of the base piece 10. When installed on a stringed instrument 2, the posts 30 extend into and at least partially reside within corresponding bores (not shown) formed in the body 38 of the stringed instrument 2. As best shown in FIG. 4, in certain embodiments, the pair of posts 30 can be positioned proximate to opposing distal ends of the elongated base piece 10. The posts may be affixed to the base piece 10 by a variety of mechanisms, such as a screwed, braised, press-fit or flanged attachment 32. In certain embodiments, each of the posts 30 may comprise an interior threaded portion configured to be threadedly coupled to corresponding height adjustment screws 28 secured within the bores. The overall string height of the bridge 8 may be adjusted using the height adjustment screws 28, which may be accessed via a hole 34 that opens into the threaded post 30.

As best shown in FIG. 3, in certain embodiments, a pair of adaptor collars 42 are rotatably coupled around the posts 30. In certain embodiments, the collars 42 comprise a substantially cylindrical outer geometry, although other geometries, such as hex, elliptic cylinder, etc., may also be used that impart the same or similar functionality as described below. In certain embodiments, the collars 42 may comprise an indented portion 43 formed in the outer geometry, which allows for a wrench or other tool to be used to rotate the collars 42 about the posts 30. When installed in the stringed instrument, the collars 42 contact a surface within the corresponding bores, thereby restricting movement of the posts 30 within the bores and the movement of the bridge 8 on the stringed instrument 2.

In certain embodiments, the collars 42 comprise a center axis and an inner diameter offset from the center axis, such that rotating the collars 42 around the posts 30 changes the alignment of the collars 42 on the posts 30. Thus, when installed on a stringed instrument 2, the position of the bridge 8 on the stringed instrument 2 is also changed by rotating the collars 42. In certain embodiments, the collars 42 may be rotated in tandem to correct for poor neck to bridge alignment. For example, in certain embodiments, rotating the collars 42 toward each other or away from each other allows for correction of a wider or narrower insert placement (described below) due to manufacturing irregularities. Additionally, rotating both collars the same direction can shift the entire bridge assembly left or right to fine tune sting alignment along the fingerboard of an instrument 48 which is also subject to +/− tolerances in production. Likewise, once set for alignment, the collars 42 can be rotated 180 degrees to shift the bridge 8 toward the headstock 50 or towards the tailpiece 52 to allow further travel of the intonation saddles 12 in one direction or another. This is particularly advantageous given changes in location of inserts (described below) over the last sixty years of guitar production.

In certain embodiments, the posts 30 and collars 42 are rotatably and threadedly coupled. For example, as best shown in FIG. 3, the posts 30 may comprise an exterior threaded (male) portion 40 threadedly coupled to in interior threaded (female) portion 44 of the inner diameter of the collars 42. As noted above, the threaded portion 44 of the inner diameter can be offset from the center axis of the collar 42, allowing for a user to twist/screw the collar 42 in either direction to facilitate centering of the bridge 8 and string alignment.

Embodiments of the present invention are also directed to methods of installing the bridge 8 onto a stringed instrument 2. The method generally comprises inserting the posts 30 into corresponding bores formed in the body 38 of the stringed instrument 2. In certain embodiments, the pair collars 42 coupled with the posts 30 contact a surface within the corresponding bores, thereby restricting movement of the bridge 8. In this way, the bridge may be converted from a traditional “pivot” system to a fixed bridge system.

As best shown in FIG. 3, upon installation, the two posts 30 may sit in hollowed cup-shaped inserts (or thimbles) 36, which may be press fit into the bores formed in the body 30 of instrument 2. In certain such embodiments, the posts 30 may pivot within the inserts 36, for example with the action of a vibrato, or the posts 30 may be seated firmly for non-pivoting purposes. When the cup-shaped inserts 36 are present, the collar 42 may contact a surface of the insert 36, thereby restricting movement of the post 30 within the insert 36 and the bridge 8 on the instrument body 38.

FIGS. 7-10 depict an alternate embodiment of an adjustable bridge according to the present invention. For the sake of being concise, only those features that set the alternate embodiment apart from the embodiment described above are discussed, and those features common to both embodiments, while present, are not necessarily re-discussed. It is also understood that these embodiments are provided by way of illustration and should not be taken as limiting upon the scope of the present invention. Moreover, it is understood that any individual features of each adjustable bridge embodiment may be combined with the features of the other embodiment, or omitted, as desired to suit the needs of a particular adjustable bridge for the stringed instrument. Thus, it should be understood that the features described above and below may be included individually or in combination with one or more other features described herein.

Figure 7:
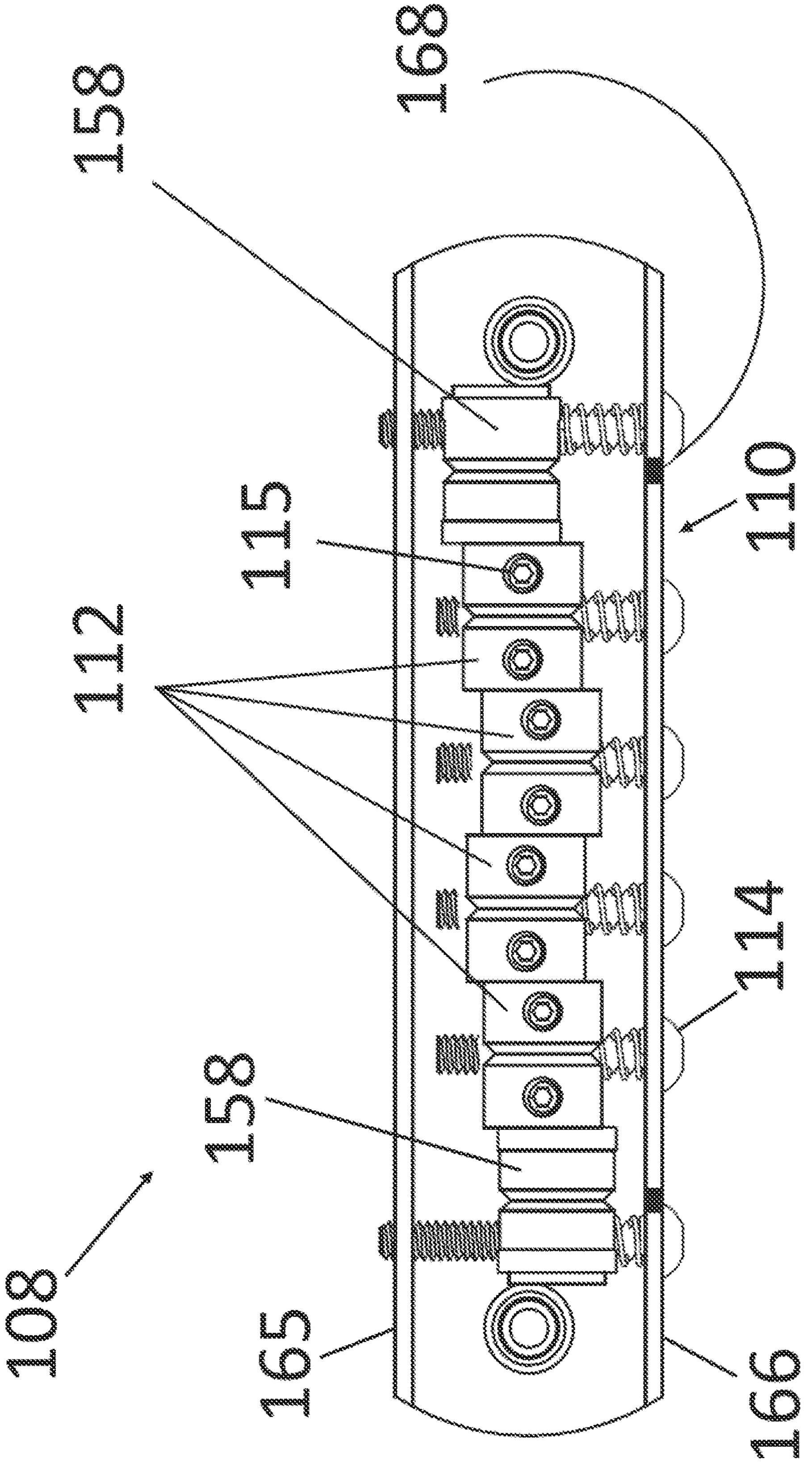
FIG. 7 is a top view of a bridge unit according to one embodiment of the present invention.
Figure 8:
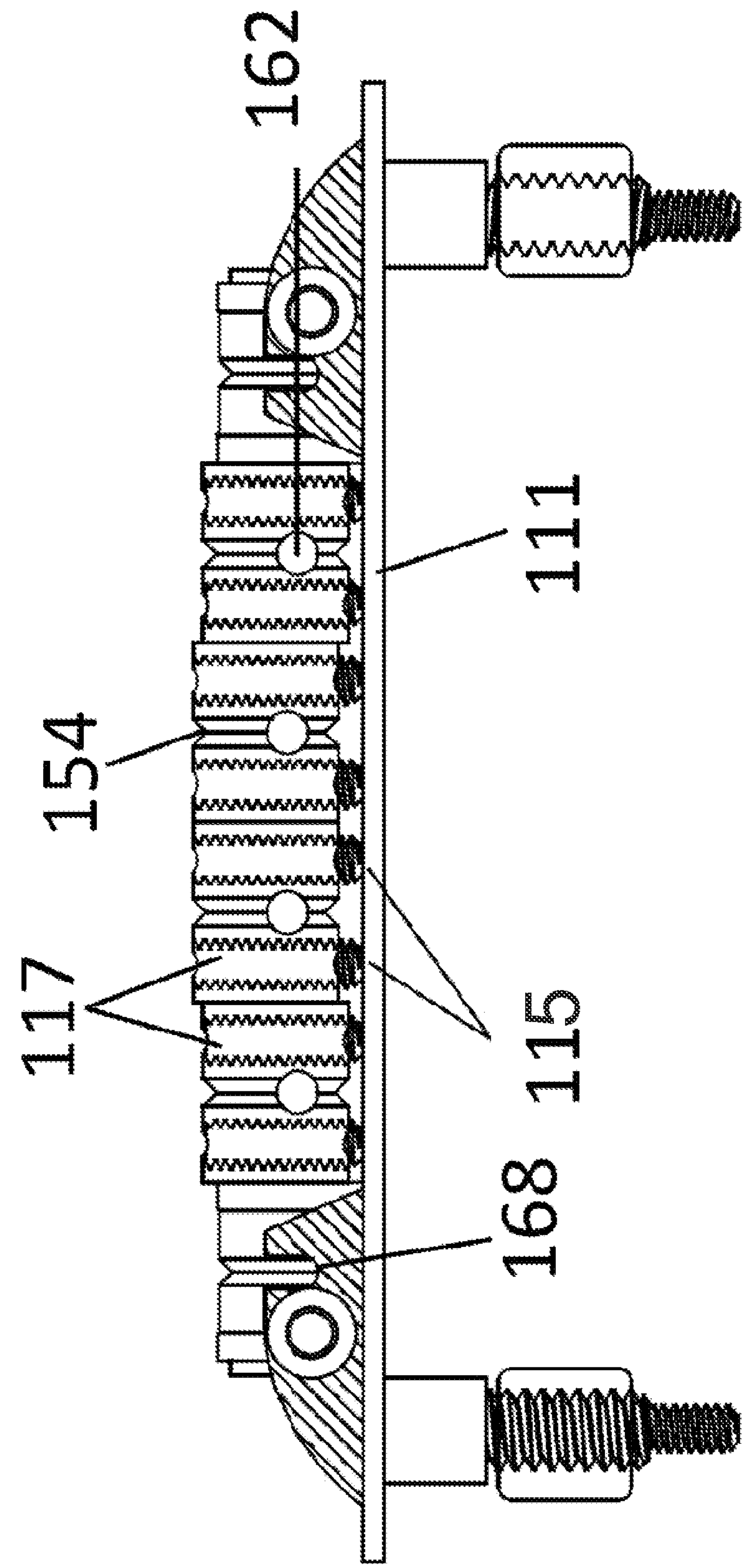
FIG. 8 is a rear view of a bridge unit according to one embodiment of the present invention, wherein certain portions of the bridge unit are cut away to illustrate internal details of the unit.

Referring now to FIGS. 7-10, a bridge 108 is shown and described below. Bridge 108 comprises a plurality of individual string saddles. As best shown in FIG. 7, bridge 108 may comprise one or more interior string saddles 112 and a pair of outermost string saddles 158 positioned at opposite distal ends of the elongated base piece 110 residing within the channel. Each of the individual string saddles comprises an intonation screw hole 162. In certain embodiments, the pair of outermost string saddles 158 comprise laterally offset intonation screw holes as described above. As shown in FIG. 8, in certain such embodiments, the laterally offset screw holes extend predominantly through a lower portion of a side segment of the string saddle. In certain embodiments, the one or more interior string saddles 112 each comprise a centralized intonation screw hole 162, for example, positioned in line with (and below) the corresponding string seat 154 of the string saddle 112. In certain embodiments, the intonation screw hole 162 formed in one or more of the interior string saddles 112 may extend predominantly through a lower portion of the string saddle.

Figure 9:
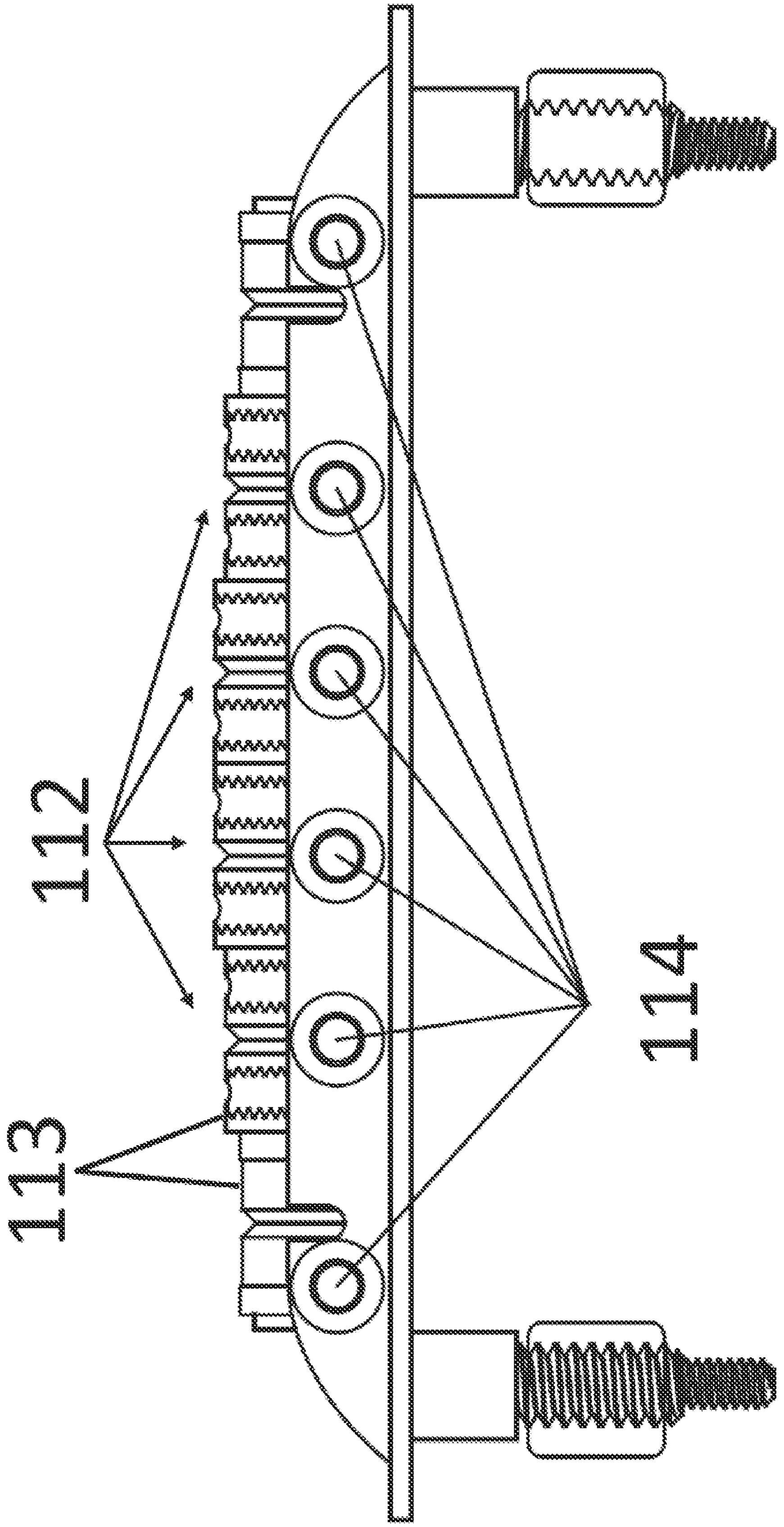
FIG. 9 is a rear view of a bridge unit according to one embodiment of the present invention, wherein certain portions of the bridge unit are cut away to illustrate internal details of the unit.

Referring now to FIG. 9, the rear plate 166 of the base piece 110 is shown, which illustrates the alignment of the intonation screw holes (and intonation screws 114) and corresponding openings in the rear plate. As shown, the openings corresponding to the interior string saddles 112 are spaced apart in substantially uniform intervals across the front plate 165 and/or rear plate 166, although the openings for the outermost string saddles 158 may be offset. Advantageously, the positioning of the intonation screw holes 162 (and screws 114) and corresponding openings provide for an optimal low-profile placement of the string saddles in the channel. Additionally, in certain embodiments, the base piece 110 comprises a plurality of notches 168 formed in an upper edge of the rear plate 166 and in line with the string seats 154 of the outermost string saddles 158.

Figure 10:
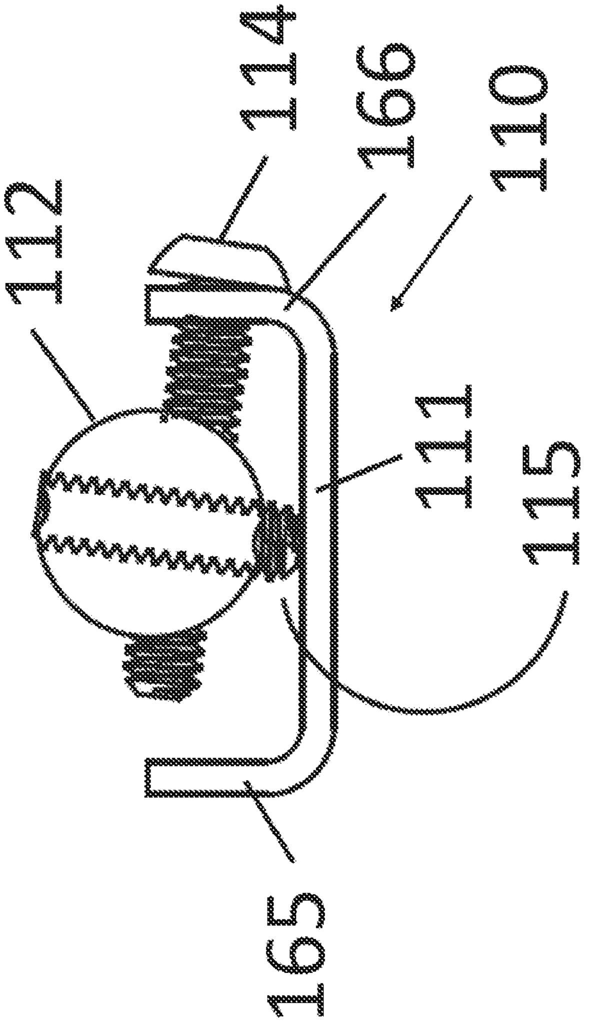
FIG. 10 is a side view of a channel portion of a bridge unit according to one embodiment of the present invention.

Referring again to FIG. 7, one or more of the interior string saddles 112 comprise individual saddle height adjustment screw holes 117 formed therethrough and corresponding height adjustment screws 115 threadedly coupled with the height adjustment screw holes 117. In certain embodiments, each of the interior string saddles 112 comprises a height adjustment screw hole 117 formed in each of the saddle side segments 113. As shown in FIG. 8, the height adjustment screws 115 coupled with the screw holes 117 contact the base plate 111 of the base piece 110, thereby defining the vertical position (i.e., height) of the corresponding string saddle 112 relative to the base piece 110 within the base piece channel. The individual height adjustment screws 115 can be adjusted to set a desired radius of the string saddles 112, thereby defining the radius of the plurality of strings residing in the plurality of string saddles 112. FIG. 10 illustrates the functionality of the height adjustment screws 115 whereby the height adjustment screws contact the base plate 111 of base piece 110, and adjusting the height adjustment screws 115 changes the position (i.e., raises or lowers) of the string saddles 112 within the channel. For example, in certain embodiments, rotating the height adjustment screw 115 changes the vertical position of the corresponding string saddle 112 relative to the base piece 110 within the channel. As shown, the height adjustment screw holes 117 (and corresponding height adjustment screws 115) are formed substantially perpendicular to the intonation screw hole 162 when viewed from the side of the string saddle 112. As used herein, the term "perpendicular" refers to the apparent intersection of two linear components (e.g., screw holes) when viewed from a two-dimensional plane (e.g., side view) but does not require that the two linear components actually intersect in three-dimensional space.

Bridge 108 described above advantageously includes the feature of the offset intonation screw holes afforded by the extended segments on the outermost saddles with corresponding deep slots (notches) in the rear plate and the benefits of the lower quadrant intonation screw hole placement across all barrel saddles and their corresponding rear plate holes as previously described herein. This additional clearance provided for the outside strings on their downward trajectory toward the tailpiece, which is an important design element as they are the lowest points in the arc of the fingerboard radius, combined with the overall low profile of the rear of the U-channel base piece, provides sufficient clearance for the centrally located strings to retain an unimpeded path from saddle to tailpiece in most possible applications.

These features advantageously allow for the use of a bridge with height adjustment screws perpendicular to and flanking a centrally located intonation screw (in the interior saddles). Such saddles are installed across the interior section of the bridge in order to provide the user with the ability to manually change the radius of the bridge, as required in certain situations, by adjusting the height of these centrally located interior saddles relative to the fixed height distal (outermost) saddles. This is particularly useful for instruments with compound radius or non-standard radius fingerboards and for those who desire to manipulate the individual string height via raising or lowering each saddle of the bridge to accommodate their own playing style and instrument set-up needs.

Although the figures and above description present features of preferred embodiments of the present inventive concept, other preferred embodiments may also be created in keeping with the principles of the invention. Furthermore, these other preferred embodiments may in some instances be realized through a combination of features compatible for use together despite having been presented independently in the above description.

Furthermore, unless otherwise specified, any directional references (e.g., upper, lower, above, below, etc.) are used herein solely for the sake of convenience and should be understood only in relation to each other. For instance, a component might in practice be oriented such that components referred to as "upper" and "lower" are sideways, angled, inverted, etc. relative to the chosen frame of reference.

The preferred forms of the invention described above are to be used as illustration only and should not be utilized in a limiting sense in interpreting the scope of the present inventive concept. Obvious modifications to the exemplary embodiments, as hereinabove set forth, could be readily made by those skilled in the art without departing from the spirit of the present inventive concept.

Additional advantages of the various embodiments of the invention will be apparent to those skilled in the art upon review of the disclosure herein and the working examples below. It will be appreciated that the various embodiments described herein are not necessarily mutually exclusive unless otherwise indicated herein. For example, a feature described or depicted in one embodiment may also be included in other embodiments, but is not necessarily included. Thus, the present invention encompasses a variety of combinations and/or integrations of the specific embodiments described herein.

As used herein, the phrase "and/or," when used in a list of two or more items, means that any one of the listed items can be employed by itself or any combination of two or more of the listed items can be employed. For example, if a structure is described as containing or excluding components A, B, and/or C, the structure can contain or exclude A alone; B alone; C alone; A and B in combination; A and C in combination; B and C in combination; or A, B, and C in combination.

I claim:

1. A bridge for a stringed instrument comprising:
- an elongated base piece comprising a front plate and a rear plate defining a channel therebetween;
- a plurality of string saddles residing within the channel and comprising a centrally positioned string seat and a pair of side segments, at least one of the side segments on at least two string saddles comprising a screw hole formed therethrough that is positioned laterally offset from the string seat; and
- at least two intonation screws, each of the at least two intonation screws passing through a corresponding opening in the front plate and/or rear plate and threadedly coupled with the offset screw hole of one of the at least two string saddles.

2. The bridge of claim 1, wherein the plurality of string saddles residing within the channel comprises one or more interior string saddles and a pair of outermost string saddles positioned at opposite distal ends of the elongated base piece.

3. The bridge of claim 2, wherein the at least two of the plurality of string saddles comprising the laterally offset screw hole comprises the pair of outermost string saddles.

4. The bridge of claim 3, wherein only the pair of outermost string saddles comprise the laterally offset screw hole.

5. The bridge of claim 2, wherein one or more of the plurality of string saddles comprises one or more height adjustment screw holes formed therethrough, the bridge further comprising one or more height adjustment screws threadedly coupled with the one or more height adjustment screw holes and contacting a base plate of the base piece.

6. The bridge of claim 5, wherein the one or more of the interior string saddles comprises the one or more height adjustment screw holes.

7. The bridge of claim 6, wherein only the one or more interior string saddles comprise the one or more height adjustment screw holes.

8. The bridge of claim 1, wherein the laterally offset screw holes formed in the at least two string saddles extends predominantly through a lower portion of the at least one of the side segments.

9. A stringed instrument comprising the bridge of claim 1 installed thereon.

10. A bridge for a stringed instrument comprising:

an elongated base piece comprising a front plate and a rear plate defining a channel therebetween;

a plurality of string saddles residing within the channel and comprising one or more interior string saddles and a pair of outermost string saddles positioned at opposite distal ends of the elongated base piece, each of the plurality of string saddles comprising a centrally positioned string seat, a pair of side segments, and an intonation screw hole formed in a lower portion of the string saddle, the intonation screw hole formed in each of the two outermost string saddles being positioned laterally offset from the string seat, the intonation screw hole formed in each of the innermost string saddles being positioned in line with the string seat; and a plurality of intonation screws passing through a corresponding opening in the front plate and/or rear plate and threadedly coupled with one of the intonation screw holes.

11. The bridge of claim 10, wherein the openings corresponding to the interior string saddles are spaced apart in substantially uniform intervals across the front plate and/or rear plate.

12. The bridge of claim 10, further comprising a compression spring positioned around each of the intonation screws and between the corresponding string saddle and the front plate or the rear plate.

13. The bridge of claim 10, wherein the openings are formed in both the front plate and the rear plate, and wherein one or more of the intonation screws passes through the corresponding openings in both the front plate and the rear plate.

14. The bridge of claim 10, wherein each of the outermost string saddles comprises an outermost side segment comprising an extended segment, and wherein the offset screw holes formed in the outermost string saddles pass through at least a portion of the extended segment.

15. The bridge of claim 10, wherein the base piece comprises a plurality of notches formed in an upper edge of the rear plate and in line with the string seats of the outermost string saddles.

16. A stringed instrument comprising the bridge of claim 10 installed thereon.

17. A bridge for a stringed instrument comprising:

an elongated base piece comprising a base plate, a front plate, and a rear plate defining a channel;

a plurality of string saddles residing within the channel comprising one or more interior string saddles and a pair of outermost string saddles positioned at opposite distal ends of the elongated base piece, each of the interior string saddles comprising a centrally positioned string seat, a pair of side segments, an intonation screw hole formed therethrough, and one or more height adjustment screw holes formed therethrough;

a plurality of intonation screws threadedly coupled with a corresponding intonation screw hole and passing through a corresponding opening in the front plate and/or rear plate; and a plurality of height adjustment screws threadedly coupled with a corresponding height adjustment screw hole and contacting the base plate.

18. The bridge of claim 17, wherein each of the plurality of height adjustment screws contacts the base plate such that rotating the height adjustment screw changes the vertical position of the corresponding string saddle relative to the base plate within the channel.

19. The bridge of claim 17, wherein each of the one or more interior string saddles comprises first and second height adjustment screw holes formed in first and second sides of the pair of side segments.

20. A stringed instrument comprising the bridge of claim 17 installed thereon.

* * * * *